United States Patent
Ge et al.

(10) Patent No.: US 12,538,115 B2
(45) Date of Patent: Jan. 27, 2026

(54) APPLICATION CONTEXT RELOCATION METHOD AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN); Yajie Hu, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 384 days.

(21) Appl. No.: 18/192,980

(22) Filed: Mar. 30, 2023

(65) Prior Publication Data

US 2023/0239675 A1    Jul. 27, 2023

Related U.S. Application Data

(63) Continuation of application No. PCT/CN2020/119763, filed on Sep. 30, 2020.

(51) Int. Cl.
| | |
|---|---|
| H04W 8/18 | (2009.01) |
| H04W 24/02 | (2009.01) |
| H04L 67/00 | (2022.01) |
| H04L 67/51 | (2022.01) |

(52) U.S. Cl.
CPC ............. *H04W 8/18* (2013.01); *H04W 24/02* (2013.01); *H04L 67/34* (2013.01); *H04L 67/51* (2022.05)

(58) Field of Classification Search
CPC ......... H04L 67/10; H04L 67/34; H04L 67/63; H04L 67/568; H04W 36/0033; H04W 36/023; H04W 8/18; H04W 8/20; H04W 24/02

USPC .................................................. 370/254
See application file for complete search history.

(56) References Cited

U.S. PATENT DOCUMENTS

| | | | |
|---|---|---|---|
| 10,419,983 B2* | 9/2019 | Zhu ................ | H04W 36/0033 |
| 2019/0387448 A1 | 12/2019 | Stauffer et al. | |
| 2020/0196203 A1 | 6/2020 | Yang et al. | |
| 2021/0058489 A1* | 2/2021 | Kim ................ | H04W 36/0033 |
| 2021/0112137 A1* | 4/2021 | Soloway .......... | H04L 67/568 |
| 2022/0124147 A1* | 4/2022 | Ge ................... | H04L 47/781 |
| 2022/0338113 A1* | 10/2022 | Gupta .............. | H04W 48/18 |

(Continued)

FOREIGN PATENT DOCUMENTS

| | | |
|---|---|---|
| CN | 107018539 A | 8/2017 |
| CN | 110167092 A | 8/2019 |
| CN | 111225348 A | 6/2020 |

OTHER PUBLICATIONS

3GPP TR 23.758, V17.0.0, "3rd Generation Partnership Project; Technical Specification Group Services and System Aspects; Study on application architecture for enabling Edge Applications; (Release 17)," Dec. 2019, 113 pages.

(Continued)

*Primary Examiner* — Jungwon Chang
(74) *Attorney, Agent, or Firm* — Fish & Richardson P.C.

(57) ABSTRACT

An application context relocation method and apparatus are provided. One example method includes: receiving first information from an application function entity, where the first information is for indicating to relocate an application context associated with the application function entity; and when an event that triggers relocation of the application context occurs, determining, based on the first information, to relocate the application context.

15 Claims, 7 Drawing Sheets

(56) References Cited

U.S. PATENT DOCUMENTS

2022/0394580 A1* 12/2022 Minokuchi ......... H04W 36/023
2023/0053805 A1*  2/2023 Kim ....................... H04L 67/63

OTHER PUBLICATIONS

Extended European Search Report in European Appln No. 20955850. 1, dated Oct. 18, 2023, 11 pages.
3GPP TS 23.558 V1.0.0, "3rd Generation Partnership Project; Technical Specification Group Services and System Aspects; Architecture for enabling Edge Applications; (Release 17)," Sep. 2020, 103 pages.
International Search Report and Written Opinion in International Appln. No. PCT/CN2020/119763, mailed on Jun. 24, 2021, 18 pages (with English translation).
3GPP TR 23.758 V0.1.0, 3rd Generation Partnership Project; Technical Specification Group Services and System Aspects; Study on application architecture for enabling Edge Applications; (Release 17), Apr. 2019, 11 pages.
Office Action in Indian Appln. No. 2023-27023161, mailed on Jun. 4, 2025, 7 pages.

\* cited by examiner

APPLICATION CONTEXT RELOCATION METHOD AND APPARATUS

CROSS-REFERENCE TO RELATED APPLICATIONS

This application is a continuation of International Application No. PCT/CN2020/119763, filed on Sep. 30, 2020, the disclosure of which is hereby incorporated by reference in its entirety.

TECHNICAL FIELD

This application relates to the field of communication technologies, and in particular, to an application context relocation method and apparatus.

BACKGROUND

In a multi-access edge computing (multi-access edge computing, MEC) architecture, a network service is provided for a terminal device (user equipment, UE) through an edge data network (edge data network, EDN). Specifically, an edge application server (edge application server, EAS) is deployed on the EDN, and the EAS provides a service for an application client (application client, AC) on a UE side. An edge enabler server (edge enabler server, EES) that can manage the EAS is deployed on the EDN, and an edge enabler client (edge enabler client, EEC) is further deployed on the UE side. The EEC can manage the AC and transmit information about the AC to the EES.

In a running process of an edge application, the UE on which the AC is deployed may move. When the UE moves outside a current service area, the EAS that currently provides the service may be incapable of continuing to provide the service for the AC that is currently run on the moving UE. In this case, an application context related to the EAS that currently provides the service needs to be relocated.

Currently, when detecting that the application context needs to be relocated, the EEC or the EES usually needs to determine, based on a communication manner and a discovery mechanism of the MEC architecture, a target EAS to which the application context needs to be relocated, and notify the EAS that currently provides the service of the target EAS, to relocate the application context. In this manner, there is a large amount of signaling exchange, and a latency is long. Consequently, application running is affected.

SUMMARY

This application provides an application context relocation method and apparatus, to delegate relocation of an application context to an edge enabler function entity such as an EEC/EES, so that the edge enabler function entity can determine to relocate the application context. This can reduce an amount of signaling exchange and shorten a latency for relocating the application context.

According to a first aspect, an embodiment of this application provides an application context relocation method. The method includes: receiving first information from an application function entity, where the first information is for indicating to relocate an application context associated with the application function entity; and when an event that triggers relocation of the application context occurs, determining, based on the first information, to relocate the application context.

In this embodiment of this application, the application function entity hosts the relocation of the application context associated with the application function entity to an edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the method further includes: performing one or more of the following operations based on the first information: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the receiving first information from an application function entity includes: receiving registration information from the application function entity, where the registration information includes the first information.

In an optional implementation, the method further includes: receiving first conditional information from the application function entity, where the first conditional information is for indicating a first effective condition of the first information.

In an optional implementation, a first effective condition includes any one or more of the following: an effective duration of the first information, an effective time period of the first information, an application client to which the first information is applicable, a relocation duration of the application context being less than a preset time threshold, a size of the application context being less than a preset size threshold, or the application function entity being overloaded.

In an optional implementation, the method further includes: receiving second conditional information from the application function entity, where the second conditional information is for indicating a second effective condition of the first information, and the second effective condition is different from the first effective condition.

In an optional implementation, the method further includes: receiving the application context from the application function entity.

In an optional implementation, before the receiving the application context from the application function entity, the method further includes: sending a storage address of the application context to the application function entity.

In an optional implementation, the application context includes identification information, and the identification information is for uniquely identifying the application context.

According to a second aspect, an embodiment of this application provides an application context relocation method, including: sending first information to an edge enabler function entity, where the first information is for indicating to relocate an application context associated with an application function entity; and receiving response information sent by the edge enabler function entity in response to the first information.

In this embodiment of this application, relocation of the application context is hosted to the edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the first information is further for indicating the edge enabler function entity to perform one or more of the following operations: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the sending first information to an edge enabler function entity includes: sending registration information to the edge enabler function entity, where the registration information includes the first information.

In an optional implementation, the method further includes: sending first conditional information to the edge enabler function entity, where the first conditional information is for indicating a first effective condition of the first information.

In an optional implementation, the first conditional information includes any one or more of the following: an effective duration of the first information, an effective time period of the first information, an application client on which the first information is effective, a relocation duration of the application context being less than a preset time threshold, a size of the application context being less than a preset size threshold, and the application function entity being overloaded.

In an optional implementation, the method further includes: sending second conditional information to the edge enabler function entity, where the second conditional information is for indicating a second effective condition of the first information, and the second effective condition is different from the first effective condition.

In an optional implementation, after the sending first information to an edge enabler function entity, the method further includes: sending the application context to the edge enabler function entity.

In an optional implementation, before the sending the application context to the edge enabler function entity, the method further includes: receiving a storage address of the application context from the edge enabler function entity; and sending the application context to the edge enabler entity based on the storage address.

In an optional implementation, the application context includes identification information, and the identification information is for uniquely identifying the application context.

According to a third aspect, an embodiment of this application provides an application context relocation apparatus. The apparatus includes: a communication module, configured to receive first information from an application function entity, where the first information is for indicating to relocate an application context associated with the application function entity; and a processing module, configured to: when an event that triggers relocation of the application context occurs, determine, based on the first information, to relocate the application context.

In this embodiment of this application, the application function entity hosts the relocation of the application context associated with the application function entity to an edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the processing module is further configured to perform one or more of the following operations based on the first information: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the communication module is specifically configured to receive registration information from the application function entity, where the registration information includes the first information.

In an optional implementation, the communication module is further configured to receive first conditional information from the application function entity, where the first conditional information is for indicating a first effective condition of the first information.

In an optional implementation, a first effective condition includes any one or more of the following: an effective duration of the first information, an effective time period of the first information, an application client to which the first information is applicable, a relocation duration of the application context being less than a preset time threshold, a size of the application context being less than a preset size threshold, or the application function entity being overloaded.

In an optional implementation, the communication module is further configured to receive second conditional information from the application function entity, where the second conditional information is for indicating a second effective condition of the first information, and the second effective condition is different from the first effective condition.

In an optional implementation, the communication module is further configured to receive the application context from the application function entity.

In an optional implementation, before receiving the application context from the application function entity, the communication module is further configured to send a storage address of the application context to the application function entity.

In an optional implementation, the application context includes identification information, and the identification information is for uniquely identifying the application context.

According to a fourth aspect, an embodiment of this application provides an application context relocation apparatus, including: a communication module, configured to send first information to an edge enabler function entity, where the first information is for indicating to relocate an application context associated with an application function entity. The communication module is further configured to receive response information sent by the edge enabler function entity in response to the first information.

In this embodiment of this application, relocation of the application context is hosted to the edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the first information is further for indicating the edge enabler function entity to perform one or more of the following operations: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the communication module is further configured to send registration information to the edge enabler function entity, where the registration information includes the first information.

In an optional implementation, the communication module is further configured to send first conditional information to the edge enabler function entity, where the first conditional information is for indicating a first effective condition of the first information.

In an optional implementation, the first conditional information includes any one or more of the following: an effective duration of the first information, an effective time period of the first information, an application client on which the first information is effective, a relocation duration of the application context being less than a preset time threshold, a size of the application context being less than a preset size threshold, and the application function entity being overloaded.

In an optional implementation, the communication module is further configured to send second conditional information to the edge enabler function entity, where the second conditional information is for indicating a second effective condition of the first information, and the second effective condition is different from the first effective condition.

In an optional implementation, after sending the first information to the edge enabler function entity, the communication module is further configured to send the application context to the edge enabler function entity.

In an optional implementation, before sending the application context to the edge enabler function entity, the communication module is further configured to: receive a storage address of the application context from the edge enabler function entity; and send the application context to the edge enabler entity based on the storage address.

In an optional implementation, the application context includes identification information, and the identification information is for uniquely identifying the application context.

According to a fifth aspect, an embodiment of this application provides a communication apparatus, including a processor and a memory.

The memory is configured to store a computer program.

The processor is configured to execute the computer program stored in the memory, to enable the method in any optional implementation of either of the first aspect and the second aspect to be performed.

According to a sixth aspect, a communication apparatus is provided, including a processor and an interface circuit.

The interface circuit is configured to receive code instructions and transmit the code instructions to the processor.

The processor is configured to run the code instructions, to enable the method in any optional implementation of either of the first aspect and the second aspect to be performed.

According to a seventh aspect, a computer-readable storage medium is provided. The computer-readable storage medium stores instructions; and when the instructions are executed, the method in any optional implementation of any one of the first aspect to the third aspect is performed.

According to an eighth aspect, an embodiment of this application provides a computer program product, and the computer program product includes computer program code. When the computer program code is run, the method in any optional implementation of either of the first aspect and the second aspect is performed.

For technical effects that can be achieved in the fifth aspect to the eighth aspect, refer to descriptions of technical effects that can be brought by the corresponding technical solutions in the first aspect and the second aspect. Details are not described herein again.

DESCRIPTION OF EMBODIMENTS

Embodiments of this application may be applied to a 4G system, a 5G system, or a future mobile communication system, and are specifically applied to a multi-access edge computing (multi-access edge computing, MEC) architecture.

The following describes in detail embodiments of this application with reference to accompanying drawings.

Figure 1:
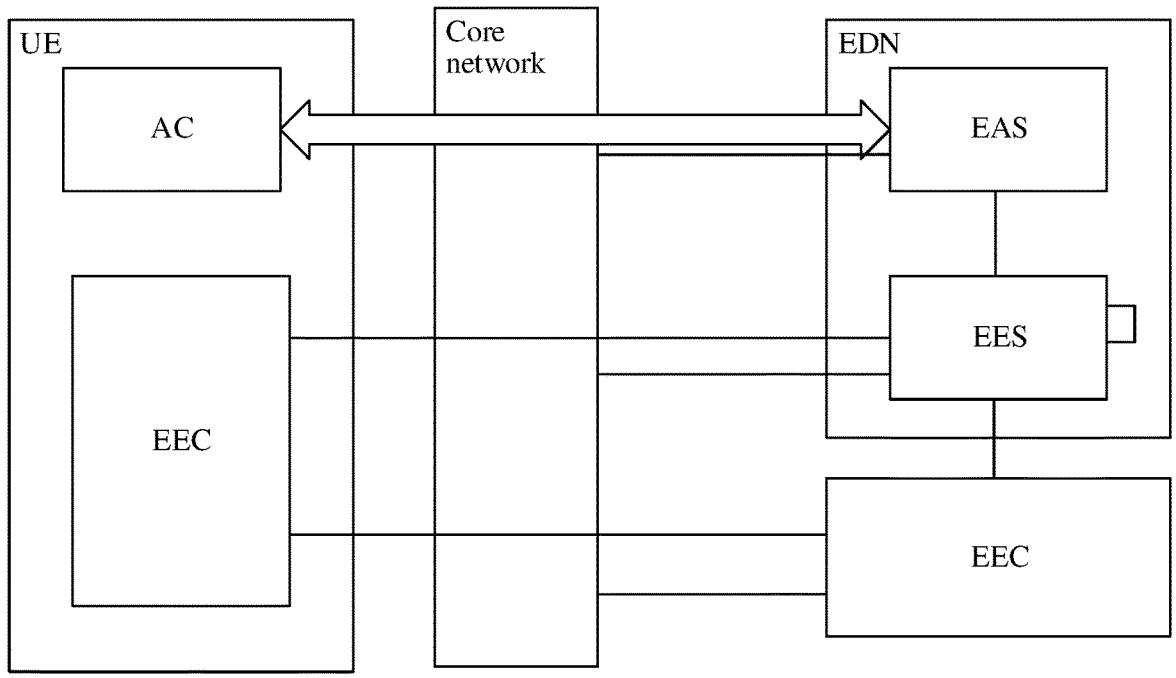
FIG. 1 is a schematic diagram of a model of an MEC architecture according to an embodiment of this application.

A schematic diagram of a model of an MEC architecture shown in FIG. 1 shows an edge application server and an edge enabler server on an edge data network side, and an application client and an edge enabler client on a terminal device side.

An edge data network (edge data network, EDN) corresponds to a data network deployed at an edge, and may be a local data network (local DN) or a local area data network (local area data network, LADN). The edge data network includes an edge enabling function, and may be identified by using a data network access identifier (data network access identifier, DNAI) and a data network name (data network name, DNN) or by using a data network name and a data network service area (service area). Alternatively, it may be understood that the edge data network may be considered as a data center deployed locally relative to a central cloud. The edge data network may be identified by using the DNAI, and an edge data network may include a plurality of local data networks (local DNs).

The edge application server (edge application server, EAS) indicates a server application program deployed in the edge data network, and may also be referred to as an application instance, an edge application instance, an MEC application (server), an EAS function, or the like. For example, the edge application server indicates an application instance (instance) in which an application such as social media software, augmented reality (augmented reality, AR), or virtual reality (virtual reality, VR) is deployed and run in the EDN. For an application, one or more EASs may be deployed in one or more EDNs. EASs deployed and run in different EDNs may be considered as different EASs of the application. Different EASs of the application may share a same domain name, and different EASs of the application may use a same anycast IP address or different IP addresses. The edge application server EAS may further include an application context of an application corresponding to the EAS. Optionally, the application context may further include a context, on the EAS, of one or more application users who use the application, for example, include running status information related to the one or more application users who use the application, a transaction identifier for a subscription, on the EAS, of the one or more application users. Optionally, the application context may further include a context of a subscription on the EAS and in a core network, for example, a transaction identifier for the subscription, of the one or more application users who use the application.

The edge enabler server (edge enabler server, EES) is deployed in the EDN, and may provide an edge computing enabling service for an application instance deployed in the EDN, namely, the foregoing EAS, to better support deployment and running of the application in the MEC. The EES may support registration of the EAS, support authentication and authorization on a terminal device (user equipment, UE) or authentication and authorization on the edge enabler client, and provide information about the application instance, for example, information about an IP address, for the UE. Generally, an EAS may be registered with an EES, or information about an EAS may be configured on the EES through a management system. In this case, the EES is referred to as an EES associated with the EAS, and the EES may control (manage) the EAS registered with or configured on the EES, or control (manage) a service EES of the EAS. The EES further supports obtaining of the information about the application instance, for example, an identifier of the application instance and information about an address (for example, the information about the IP address) of the application instance, and further sends the information about the application instance, for example, the identifier of the application instance, to an edge configuration server (edge configuration server, ECS). The ECS is responsible for configuration of the EDN, for example, providing information about the EES for the UE, providing information about the EAS for the UE, and interacting with a DNS of the application to obtain the information about the EAS. Further, the ECS may obtain the information about the application instance and the information about the IP address from another function entity and store the information. The model of the MEC architecture shown in FIG. 1 further shows the foregoing ECS.

The application client (application client, AC) is a client program of an application on the terminal device side, and is a peer entity of the EAS on the terminal device side. The application client is used by an application user (user) to obtain an application service from an application server. The application client may be connected to an application server on a cloud to obtain an application service, or may be connected to an EAS that is deployed and run, in one or more EDNs, for the application, to obtain the application service.

The edge enabler client (edge enabler client, EEC) is a peer entity of the EES on the terminal device side. The EEC is configured to: register information about the EEC and information about the application client AC with the EES, perform security authentication and authorization, obtain the information about the EAS, for example, information about an address (for example, an IP address) of the EAS from the EES, and provide an edge computing enabling capability for the application client. For example, an EEC discovery service may return the IP address of the EAS to the application client.

As shown in FIG. 1, a communication connection is established between the application client AC on the terminal device side and the edge application server EAS; and a communication connection is established between the edge enabler client EEC on the terminal device side and the edge enabler server EES. By signing a service agreement with a provider of the application, the application user may use the application by logging in to the application client AC deployed on the terminal device, and exchanges and transmits application data (application data) by using the communication connection between the application client AC and the EAS. The application user may obtain, by using the application client AC and through an application programing interface (application programing interface, API), a service that is from the edge enabler client EEC and that is provided by the edge enabler server EES.

Based on a definition of a current standard, the MEC architecture shown in FIG. 1 includes the following two-level discovery mechanism: discovering the EES from the ECS by the EEC and discovering the EAS from the EES by the EEC. First, the discovering the EES from the ECS by the EEC includes the following procedure: The EEC discovers, in a request or subscription manner, an EES or an EDN that the ECS is interested in, and obtains information about one or more ESSs, for example, obtains information about an EES corresponding to a location of the UE. Second, the discovering the EAS from the EES by the EEC includes the following procedure: The EEC requests the EES for a target edge application instance EAS that is to be accessed by the EES, where optionally, the EEC indicates, in a request, a discovery filtering parameter provided by the application user. The EES matches, based on information about an EAS that is locally registered or is already online and/or the discovery filtering parameter provided by the application user, one or more EASs that meet the request, and feeds back information about the one or more EASs that meet the request to the EEC. Further, the EEC may provide the received information about the one or more EASs to the application client AC, so that the AC is connected to the foregoing EAS.

In a running process of an edge application, there is a case in which the terminal device UE on which the application client is deployed moves, for example, the UE moves from an area corresponding to an EDN to an area corresponding to another EDN. When the terminal device moves outside a current service area, the edge application server that currently provides a service may be incapable of continuing to provide the service for the application client that is currently run on the foregoing moving UE. In other words, the edge application server that currently provides the service is no longer an optimal edge application server that can provide the service for the application client on the UE, and there is another edge application server that is more suitable for serving the application client on the UE. In this case, a new edge application server needs to be selected to replace the foregoing edge application server (which may be referred to as a source edge application server) that currently provides the service, and the new edge application server is used to provide the service for the application client on the UE. In this process, an application service is temporarily suspended or interrupted. In this case, an application context of the source edge application on the application client needs to be relocated to the new edge application server, so that the application client can quickly continue the ongoing service after being connected to a target edge application server, to reduce impact caused by the interruption of the application.

Currently, when detecting that the application context needs to be relocated, the EEC/EES usually needs to determine, based on a communication manner and the discovery mechanism of the MEC architecture, a target EAS to which the application context is to be relocated, and notify the EAS that currently provides the service, to relocate the application context. In this manner, there is a large quantity of signaling exchange, and a latency is long. As a result, application running is affected.

Based on this, embodiments of this application provide an application context relocation method and apparatus. An edge enabler function entity such as the foregoing EEC/EES is licensed (which may alternatively be described as "requested" or "delegated") to host the relocation of the application context, so that the edge enabler function entity is responsible for determining to relocate the application context, and even entirely responsible for all operations of relocating the application context, to reduce an amount of signaling exchange with the EAS and shorten a latency for relocating the application context. Because problem-resolving principles of the method and the apparatus are the same, mutual reference may be made to method embodiments and apparatus embodiments, and repeated content is not described again.

"A plurality of" mentioned in embodiments of this application means two or more. The term "and/or" describes an association relationship for describing associated objects and represents that three relationships may exist. For example, A and/or B may represent the following three cases: Only A exists, both A and B exist, and only B exists. The character "/" generally represents an "or" relationship between the associated objects. In addition, it should be understood that although terms such as "first" and "second" may be used in embodiments of the present invention to describe data, the data should not be limited by these terms. These terms are merely used to distinguish the data from each other.

The following describes in detail the application context relocation method provided in embodiments of this application with reference to the accompanying drawings.

Figure 2:
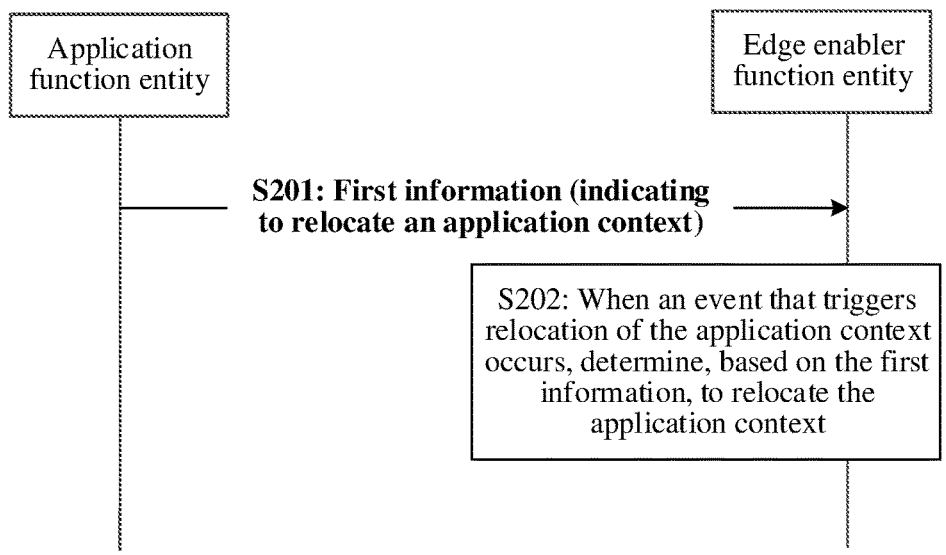
FIG. 2 is a schematic flowchart 1 of an application context relocation method according to an embodiment of this application.

As shown in FIG. 2, an embodiment of this application provides an application context relocation method. The method may be applied to the foregoing model of the MEC architecture. The method includes the following procedure.

S201. An application function entity sends first information, where the first information is for indicating to relocate an application context associated with the application function entity.

The first information may be a request message, and the request message is for requesting to relocate the application context associated with the application function entity. Alternatively, the first information may be a message that can be used for requesting and subscribing to relocation of the application context, that is, requesting to relocate the application context and subscribing to a notification for the relocation of the application context. The first information may be a service API (service API), and the API may be provided by an EES or an EEC. Relocation may be understood as relocation. Relocation of the application context associated with the application function entity may be understood as follows: A serving (serving) EAS of one, a plurality, or all of application users served by the application function entity is finally switched from a source EAS to a target EAS through a series of operations. In addition, the first information may alternatively be a parameter in a message, and is for indicating a service or an operation for relocating the application context. The parameter may be a combination of one or more of a group of enumerated values, for example, {application context relocation event detection (detection), application context relocation decision (decision), application context relocation execution (execution), and application context post-relocation cleanup (cleanup)}. For example, if the parameter is "application context relocation event detection (detection) & application context relocation decision (decision) & application context relocation execution (execution) & application context post-relocation cleanup (cleanup)", it indicates that an edge enabler function entity performs the foregoing service or operation. Alternatively, the first information may be indicated by using a specific bit (bit) of a parameter.

The application function entity may indicate the application client or the edge application server in the MEC architecture. The edge enabler function entity may indicate the edge enabler client or the edge enabler function entity in the MEC architecture. In an optional implementation, the application function entity may be an edge application server EAS, and the edge enabler function entity may be an edge enabler server EES. In another optional implementation, the application function entity may be an application client AC, and the edge enabler function entity may be an edge enabler client EEC.

The application context associated with the application function entity indicates an application context corresponding to the application function entity. Optionally, the application context may specifically include an application context related to one, a plurality, or all of application users associated with the application function entity. Optionally, the application context includes identification information, and the identification information is for uniquely identifying an application context of an application user. For example, if application contexts related to different application users need to be distinguished, the foregoing identification information may be an identifier of the UE, for example, an IP address or a subscription permanent identifier (subscription permanent identifier, SUPI). In addition, the foregoing identification information may alternatively be an identifier of the application client, for example, a uniform resource locator (uniform resource locator, URL) address.

Optionally, the edge enabler function entity may further send response information of the first information to the application function entity in response to the first information.

S202. When an event that triggers relocation of the application context occurs, the edge enabler function entity determines, based on the first information, to relocate the Optionally, when detecting that a terminal device related to the foregoing application function entity moves, the edge enabler function entity may determine that a service continuity event occurs, that is, detect the event that triggers relocation of the application context. It may be understood as that the edge enabler function entity may detect some events, and determine, based on the events, that the application context may need to be relocated.

In this embodiment of this application, the application function entity hosts the relocation of the application context associated with the application function entity to the edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the application function entity is the edge application server EAS, and the edge enabler function entity is the edge enabler server EES. The edge enabler function entity may further perform one or more of the following operations (1) to (5).

(1) Detect an event that triggers relocation of the application context.

(2) Discover a target application function entity, where the target application function entity is configured to receive the application context. The target application function entity may be an edge application server EAS. The EES may discover a target EAS, and relocate the application context associated with the foregoing EAS that sends the first information to the target EAS. An application corresponding to the EAS that sends the first information is the same as an application corresponding to the target EAS, that is, the target EAS and the EAS that sends the first information are two different application instances of a same application.

(3) Transmit the application context to an edge enabler function entity associated with the target application function entity, where an application corresponding to the application function entity is the same as an application corresponding to the target application function entity, that is, the target EAS and the EAS that sends the first information are two different application instances of the same application.

(4) Send information about the target application function entity to the terminal device related to the application function entity, where the application corresponding to the application function entity is the same as the application corresponding to the target application function entity (that is, the target EAS and the EAS that sends the first information are two different application instances of the same application). Optionally, the information about the target application function entity includes registration information of the target application function entity on the edge enabler function entity associated with the target application function entity, so that an application client deployed, for the foregoing application, on the terminal device can be reconnected to the target application function entity.

(5) Send relocation information of the application context to a core network element, where the core network element may be a network exposure function (network expose function, NEF) network element, a session management function (session management function, SMF) network element, or the like.

In an optional implementation, the application function entity is the application client AC, and the edge enabler function entity is the edge enabler client EEC. The edge enabler function entity may further perform one or more of the following operations (1) to (3).

(1) Detect an event that triggers relocation of the application context.

(2) Discover a target application function entity, where the target application function entity is configured to receive the application context. The target application function entity may be an edge application server EAS. The EES may discover a target EAS, and relocate the application context associated with the foregoing EAS that sends the first information to the target EAS. An application corresponding to the EAS that sends the first information is the same as an application corresponding to the target EAS, that is, the target EAS and the EAS that sends the first information are two different application instances of a same application.

(3) Send information about the target application function entity to the terminal device related to the application function entity, where the application corresponding to the application function entity is the same as the application corresponding to the target application function entity (that is, the target EAS and the EAS that sends the first information are two different application instances of the same application). Optionally, the information about the target application function entity includes registration information of the target application function entity on the edge enabler function entity associated with the target application function entity, so that an application client deployed, for the foregoing application, on the terminal device can be reconnected to the target application function entity.

In an optional implementation, the first information may further specifically indicate a related operation (or referred to as a service) of relocating the application context associated with the application function entity. In this case, after receiving the first information, the edge enabler function entity performs the operation indicated by the first information. The operation may indicate an independent operation, and the independent operation includes only one atomic function (where the atomic function may also be referred to as an atomic operation or atomic service). Alternatively, the operation may indicate a compound operation, and the compound operation includes a plurality of atomic functions. It is more flexible to host some permission related to the relocation of the application context to the edge enabler function entity. For example, that the EAS sends the first information to the EES is used as an example. The EAS may indicate, by using the first information, the EES to implement one, a plurality, or all of the following: detecting an event that triggers relocation of the application context; determining to relocate the application context; discovering the target EAS; transferring (transferring) the application context from the EAS to the target EAS or a target EES; and sending information about the target EAS to the terminal device.

In an optional implementation, a condition that needs to be met for the edge enabler function entity to implement an indication of the first information may be further set. Optionally, the application function entity may send first conditional information to the edge enabler function entity, where the first conditional information is for indicating a first effective condition of the first information. The application function entity may send the first conditional information and the first information together to the edge enabler function entity, or may separately send the first information and the first conditional information to the edge enabler function entity. This is not limited in this embodiment of this application.

Optionally, the first effective condition includes any one or more of the following: an effective duration of the first information, an effective time period of the first information, an application client to which the first information is applicable, a relocation duration of the application context being less than a preset time threshold, a size of the application context being less than a preset size threshold, or the application function entity being overloaded.

The effective duration of the first information indicates that the edge enabler function entity may implement the indication of the first information within a specified duration after the edge enabler function entity receives the first information. The effective time period of the first information indicates that the edge enabler function entity may implement the indication of the first information within the effective time period. The application client to which the first information is applicable may be the identifier of the UE, the IP address of the UE, the identifier of the application client, an identifier of an edge enabler client, or the like. The parameter specifically indicates that the edge enabler function entity may implement the indication of the first information for an application context of an application user corresponding to the application client on the terminal device by using the identifier of the UE. Optionally, if the first effective condition does not include the application client to which the first information is applicable, it indicates that the edge enabler function entity may implement the indication of the first information for application contexts of all the application users. The relocation duration of the application context being less than the preset time threshold indicates that the edge enabler function entity may implement the indication of the first information only when the relocation duration of the application context is less than the preset time threshold. The size of the application context being less than the preset size threshold indicates that the edge enabler function entity may implement the indication of the first information only when the size of the application context is less than the preset size threshold. The application function entity being overloaded is for indicating that the application function entity may implement the indication of the first information when the application function entity is overloaded.

Optionally, it may be further set that the condition that needs to be met for the edge enabler function entity to implement the indication of the first information can be changed. In an example implementation, the application function entity may further send second conditional information to the edge enabler function entity, where the second conditional information is for indicating a second effective condition of the first information, and the second effective condition is different from the first effective condition. In a possible design, the second effective condition and the first effective condition include a same parameter, but values of the parameter are different in the first effective condition and the second effective condition. For example, both the first effective condition and the second effective condition include the effective duration of the first information, but specific effective durations are different in the first effective condition and the second effective condition. For another example, the preset time threshold is set differently in the first effective condition and the second effective condition. In another possible design, the second effective condition and the first effective condition include different parameters. For example, the second effective condition includes the application client to which the first information is applicable, but the first effective condition does not include the application client to which the first information is applicable.

In an optional implementation, the edge enabler function entity may further obtain the application context associated with the application function entity, to implement operations such as determining the size of the application context, determining the relocation duration of the application context, and performing transfer (transfer) on the application context.

Optionally, if the EAS indicates, by using the first information, the EES to relocate the application context associated with the EAS, the EAS may send the application context associated with the EAS to the EES. Specifically, the EAS may send the application context to the EES based on a storage address (or referred to as a hosting address) that can be accessed by the EES. The storage address stores the application context. Optionally, the storage address that can be accessed by the EES may be implemented with reference to either of the following two manners. Manner 1: The hosting address may be locally configured on the EAS. The address is used by the EAS to store a to-be-relocated or to-be-synchronized application context of one or more application users served by the EAS, and the EAS stores the to-be-relocated application context in the hosting address.

Manner 2: The EES may send the storage address to the EAS actively or at the request of the EAS, so that the EAS synchronizes the application context to the EES based on the storage address. To distinguish between application contexts of a plurality of application users served by the EAS, the EAS may allocate an identifier to an application context of each user. The identifier may be an identifier of an application user, or the identifier may be an IP address of a terminal device corresponding to a client used by the application user or an identifier of the terminal device, or the identifier may be an application context identifier of another type. To keep a to-be-relocated application context up-to-date, the EAS may synchronize a latest application context to the EES periodically, for example every 5 s. The application context may be stored in an overwriting manner or in an appending manner. In the appending manner, if the application context exceeds a preset size, an application context that is earliest stored may be discarded, or an application context for relocation (relocation) saved each time carries timestamp information or checkpoint (checkpoint) information.

Optionally, if the AC indicates, by using the first information, the EEC to relocate the application context associated with the AC, the application context associated with the AC is stored on an EAS that is deployed and run, in an EDN, for an application corresponding to the AC. In this case, the application context may be stored on the EES with reference to the following two manners. Manner 1: The AC interacts with the EAS and requests the EAS to synchronize the application context to the EES. Manner 2: The EEC needs to request the EES associated with the EAS to synchronize the application context, and the EES requests the EAS to synchronize the application context. In this case, the EAS may synchronize the application context to the EES.

The following describes in detail an implementation process of the foregoing application context relocation method with consideration of features of different applications.

For some applications, for example, applications with stable service running, such as video applications, application context relocation may be performed at any time. In an optional implementation, the foregoing application context relocation method may be implemented based on a registration procedure of the application function entity. Further, optionally, the first information may be transmitted to the edge enabler function entity by being included in registration information of the application function entity.

Figure 3:
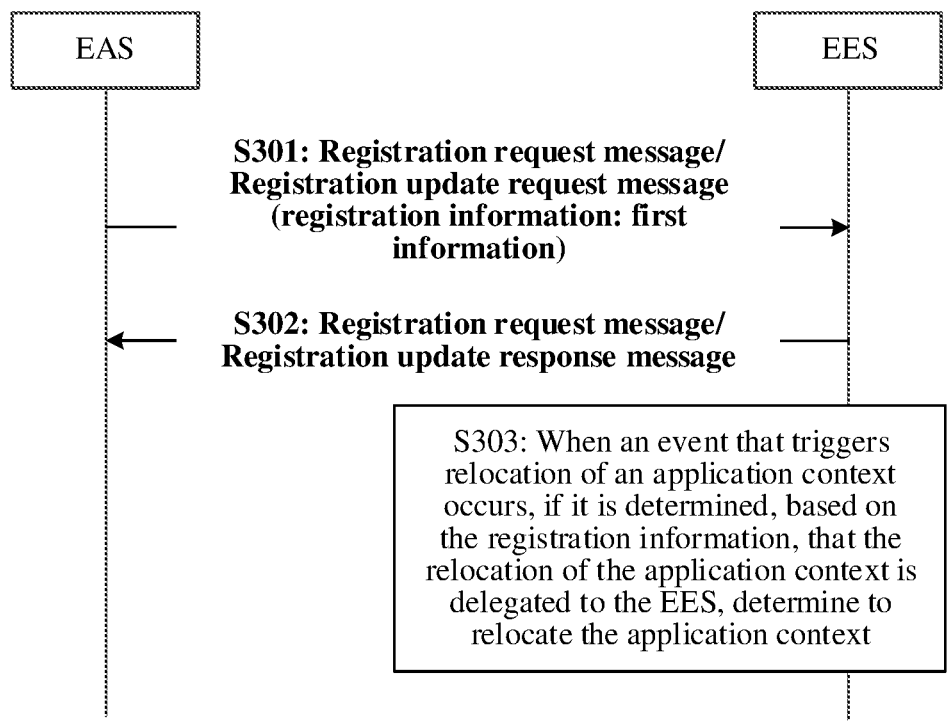
FIG. 3 is a schematic flowchart of registering an EAS with an EES according to an embodiment of this application.

For example, a procedure in which an EAS registers with an EES shown in FIG. 3 includes the following steps.

S301. The EAS sends a registration request (registration request) message or a registration update request (registration update request) message to the EES, where the registration request message or the registration update request message carries registration information, and the registration information includes the foregoing first information. Optionally, the registration information may be an EAS profile, and the first information included in the EAS profile may be referred to as an application relocation delegate indication (relocation delegate indication), an application relocation license, an application relocation agent, an application relocation decision license, an application relocation decision license, an application relocation decision agent, or the like. Optionally, the EAS profile includes content shown in the following Table 1.

TABLE 1

| Information element Information element | Status Status | Description Description |
|---|---|---|
| Edge application server identifier EAS ID | Mandatory M | Indicates an identifier of an edge enabler server The identifier of the EAS. |
| Edge application server endpoint EAS Endpoint | Mandatory M | Indicates endpoint information (for example, a URI, an FQDN, and an IP address), which is for performing communication with the edge application server. The information may be discovered by an EEC and exposed to an application client, so that the application client can establish contact with the EAS. |
| Application client identifier Application Client ID | Optional O | Identifies an application client that the EAS can serve. |
| EAS provider identifier EAS Provider Identifier | Optional O | Indicates an identifier of an EAS provider. |
| EAS type EAS Type | Optional O | Indicates a class or type of the EAS (for example, V2X). |
| EAS description EAS description | Optional O | Indicates an easy-to-read EAS description. |
| EAS schedule EAS Schedule | Optional O | Indicates an availability schedule of the EAS (for example, a time window). |
| EAS service area EAS Service Area | Optional O | Indicates a geographical service area served by the EAS. |
| EAS service KPIs EAS Service KPIs | Optional O | Indicates service characteristics provided by the EAS. |
| EAS service permission level EAS Service Permission Level | Optional O | Indicates a service permission level supported by the EAS. |
| EAS feature EAS Feature | Optional O | Indicates a service feature supported by the EAS. |
| Service continuity support Service continuity support | Optional O | Indicates whether the EAS supports service continuity. This IE may also indicate whether the EAS supports relocation of an application context. |
| EAS DNAI | Optional O | Indicates a DAI associated with the EAS. This IE may be used as a potential location of an application. |

TABLE 1-continued

| Information element Information element | Status Status | Description Description |
|---|---|---|
| EAS availability reporting periodicity EAS Availability Reporting Period | Optional O | Indicates an availability reporting periodicity, which indicates how often an EES needs to check EAS availability after successful registration. |
| EAS required service APIs EAS Required Service APIs | Optional O | Indicates a list of service APIs that the EAS needs to use. |
| EAS status EAS Status | Optional O | Indicates a status of the EAS (for example, enabled, disabled). |
| relocation delegate indication | Optional O | Indicates that the relocation of the application context is delegated to the EES. |

S302. The EES sends a registration response (registration response) message or a registration update response (registration update response) message to the EAS.

Optionally, the EAS may include a storage address (or referred to as a hosting address) of the application context in the registration response message or the registration update response message, to indicate the EAS to send the application context to the EES. The application context is an application context that needs to be synchronized during relocation. The storage address of the application context may be an IP address, a port number, or a URL address. In an edge data network environment, the EES and the EAS are usually deployed in a same data center and may be deployed on a same storage resource. In this case, that the EAS sends the application context to the EES may be understood as that the EAS stores the application context in a storage unit identified by a storage address. The EES may read the application context in the storage unit identified by the storage address, that is, the EAS and the EES may be two logical function modules in a same node. Transfer of the application context may be implemented through storage space sharing and rights management of the application context. This is different from a conventional manner in which two nodes exchange data through a physical cable. The storage address and the storage unit corresponding to the storage address may be managed by the EES.

S303. When an event that triggers relocation of the application context occurs, if the EES determines, based on the registration information of the EAS, that the relocation of the application context is delegated to the EES, the EES may determine to relocate the application context.

Optionally, the EES may determine to relocate the application context, and perform a related operation of relocating the application context. For example, when the first information indicates that, that the EES relocates the application context includes transferring the application context, the related operation includes one, a plurality, or all of the following: The EES discovers a target EAS; the EES transfers the application context to the target EAS or an EES associated with the target EAS; the EES notifies an EEC that switching of the application context is completed, and sends information about the target EAS to the EEC; and the EES sends, to a 3GPP core network element, relocation information of the application context, for example, the information about the target EAS and information about N6 corresponding to the target EAS. When the first information indicates that, that the EES relocates the application context does not include transferring the application context, or there is no application context on the EES, the related operation includes one, a plurality, or all of the following: The EES discovers the target EAS; the EES notifies a source EAS of an address of the target EAS or the EES requests the source EAS to transfer the application context to the target EAS; the EES notifies the EEC that the switching of the application context is completed, and sends the information about the target EAS to the EEC; and the EES sends, to the 3GPP core network element, the relocation information of the application context, for example, the information about the target EAS and the information about N6 corresponding to the target EAS. In addition, optionally, the EES associated with the target EAS may replace the target EAS to determine whether to receive the relocation of the foregoing application context. In this case, the EES transfers the application context to the EES associated with the target EAS, and the EES associated with the target EAS may also replace the target EAS to determine whether to receive the application context. In addition, the EES may further perform, based on the first information in the registration information of the EAS, the following operation: detecting an event that triggers relocation of the application context.

Figure 4:
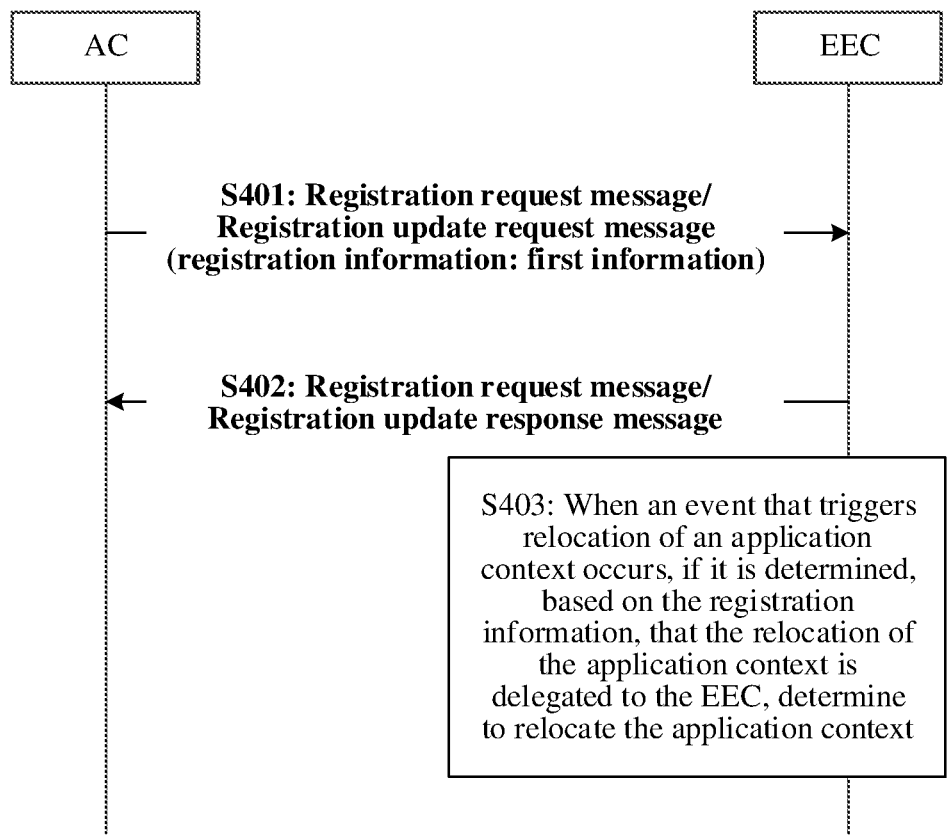
FIG. 4 is a schematic flowchart of registering an AC with an EEC according to an embodiment of this application.

For example, a procedure in which an AC registers with an EEC shown in FIG. 4 includes the following steps.

S401. The AC sends a registration request (registration request) message or a registration update request (registration update request) message to the EEC, where the registration request message or the registration update request message carries registration information, and the registration information includes the foregoing first information. Optionally, the registration information may be an AC profile, and first indication information included in the AC profile may be referred to as an application relocation delegate indication (relocation delegate indication), an application relocation license, an application relocation agent, an application relocation decision license, an application relocation decision license, an application relocation decision agent, or the like. Optionally, the AC profile includes content shown in the following Table 2.

TABLE 2

| Information element Information element | Status Status | Description Description |
|---|---|---|
| Application Client ID Application client ID | M | Indicates an identifier of an application client. |

TABLE 2-continued

| Information element | Status | Description |
|---|---|---|
| List of EAS IDs | O | Indicates a list of EAS IDs that serve the application client. |
| Application Client Type | O | Indicates a class or type of the application client (for example, V2X). |
| Preferred ECSP List | O | Indicates an identifier of an edge computing service provider. The application client or the EEC wants to connect to an EES associated with the edge computing service provider. |
| Application Client Schedule | O | Indicates a timetable (for example, a time window) of an expected operation of the application client. |
| Application Client Service Area | O | Indicates an expected location of hosting UE in the operation schedule of the application client. This geographic information may represent a geographic point, a polygon, a route, a signal map, or a waypoint set. |
| Application Client Service KPIs | O | Indicates KPIs needed by the application client to receive a service from the EAS. |
| Service Continuity Support | O | Indicates whether an application needs the service continuity support. |
| relocation delegate indication | O | Indicates that relocation of an application context is delegated to the EEC. |

S402. The EEC sends a registration response (registration response) message or a registration update response (registration update response) message to the AC.

S403. When an event that triggers relocation of the application context occurs, if the EEC determines, based on the registration information of the AC, that the relocation of the application context is delegated to the EEC, the EEC may determine to relocate the application context.

Optionally, the EEC may determine to relocate the application context, and perform a related operation of relocating the application context. For example, the EEC obtains information about a target EES from an ECS, and the EEC obtains information about a target EAS from the target EES. The target EES is associated with the target EAS. The EEC triggers the AC, and the AC triggers a source EAS. The source EAS sends the application context to the target EAS. After the application context is relocated, the AC switches application data to the target EAS. For another example, the EEC notifies the target EES that application context relocation may be needed. The target EES obtains the information about the target EAS, and sends an ACR request message to the target EAS. The target EAS initiates application context transmission between the source EAS and the target EAS. After the context is relocated, the AC switches the application data to the target EAS. For another example, the EEC obtains the information about the target EAS from a source EES, and the EEC notifies the source EAS through the source EES to relocate the application context. The source EAS sends the application context to the target EAS. After the application context is relocated, the AC switches the application data to the target EAS.

For some applications, for example, an application whose service running has peak time or slack time, that is, has busy time or idle time, related permission to relocate the application context may be dynamically hosted to an edge enabler function entity. Optionally, that the edge enabler function entity needs to implement the related permission to relocate the application context under a specific condition may be set based on at least the effective condition of the first information.

Figure 5:
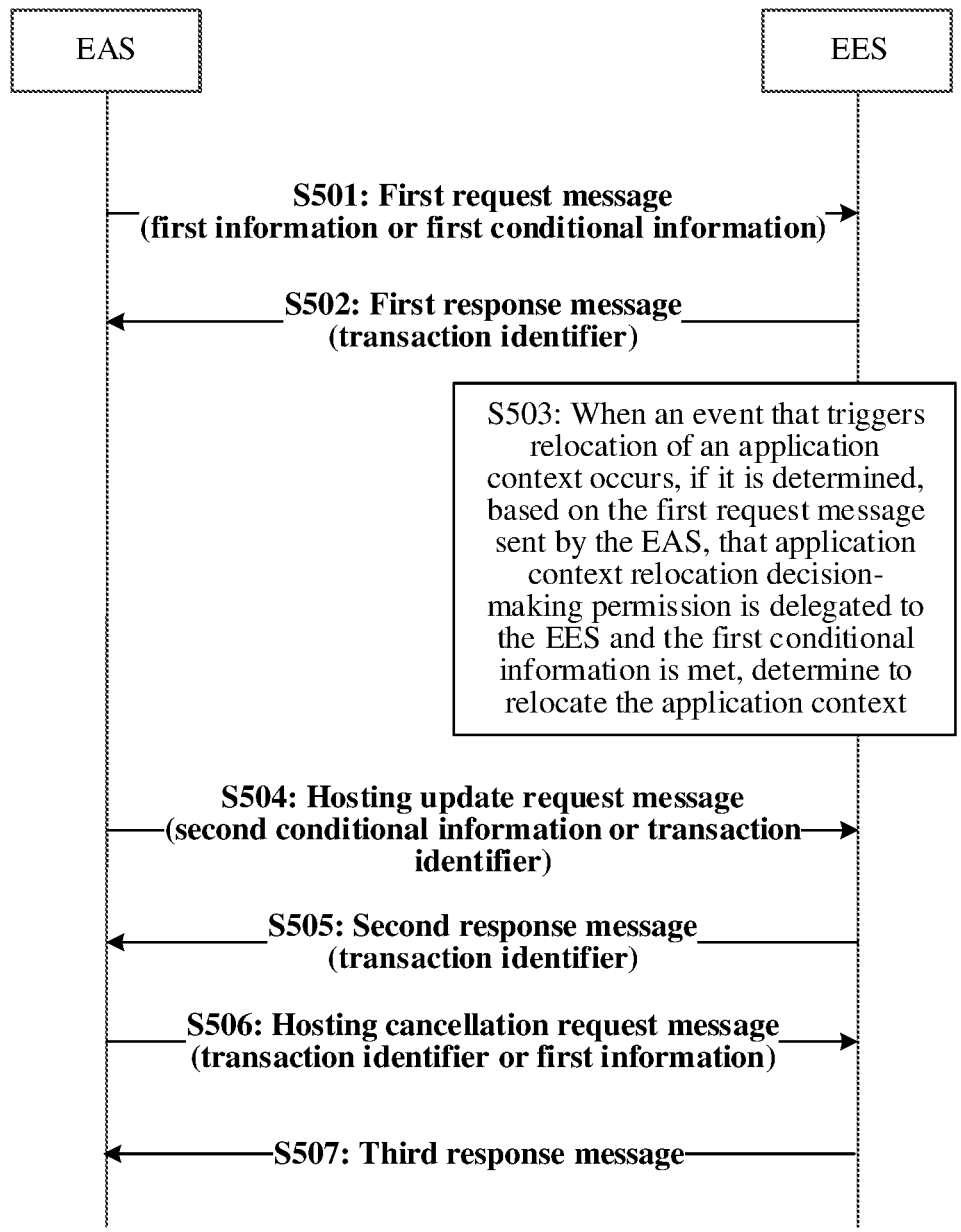
FIG. 5 is a schematic flowchart of a method in which an EAS indicates an EES to relocate an application context according to an embodiment of this application.

For example, FIG. 5 shows a procedure of a method in which an EAS indicates an EES to relocate an application context. The procedure includes the following steps.

S501. The EAS sends a first request message to the EES. The first request message is for requesting to host (delegate) application context relocation to the EES, or it is understood that the first request message is for requesting to relocate an application context associated with an application function entity. It may be further understood that the first request message may be a message that can be used for requesting and subscribing to the application context relocation, that is, requesting to relocate the application context and subscribing to a notification of the application context relocation. The first information may be a service API (service API), and the API may be provided by the EES. The first request message may alternatively be described as delegation of application context relocation decision-making permission, a hosting request message, a context relocation request, a full-service context relocation request, or the like. The first request message includes indicating or requesting the EES to determine to perform application context relocation.

Optionally, the EAS may send the first request message to the EES when a service is idle or when it is predicted that the service is about to be idle.

Optionally, as shown in FIG. 5, the first request message carries the first information and the first conditional information. Specifically, the first information may be an application context relocation delegate indication (relocation delegate indication). Optionally, the application context relocation delegate indication includes delegating the application context relocation decision-making permission to the EES. The first conditional information is for indicating a first effective condition of the first information. For content included in the first effective condition, refer to the foregoing embodiments. Details are not described again in this embodiment of this application. Optionally, the EES may store the received first information and first conditional information.

S502. The EES sends a first response message to the EAS in response to the first request message.

Optionally, the first response message may carry a transaction identifier (transaction id). The transaction identifier is used by the EAS to subsequently perform a subsequent operation on the first information, or the transaction identifier is for identifying the first information and the first conditional information that are stored on the EES. This helps the EAS update or cancel a hosting transaction subsequently.

Optionally, the first response message may carry a storage address of the application context, to indicate the EAS to synchronize the application context to the EES based on the storage address.

S503. When an event that triggers relocation of the application context occurs, if the EES determines, based on the first request message sent by the EAS, that the relocation of the application context is delegated to the EES and meets the first conditional information, the EES may determine to relocate the application context.

Optionally, the EES may determine to relocate the application context, and perform related operations of relocating the application context. For example, the EES discovers a target EAS; the EES notifies a source EAS of an address of the target EAS, or the EES requests the source EAS to transfer the application context to the target EAS; the EES notifies an EEC that switching of the application context is completed, and sends information about the target EAS to the EEC; and the EES sends, to a 3 GPP core network element, relocation information of the application context, for example, the information about the target EAS and information about N6 corresponding to the target EAS. In addition, optionally, the EES associated with the target EAS may replace the target EAS to determine whether to receive the relocation of the foregoing application context.

S504. The EAS sends a hosting update request message to the EES, where the hosting update request message is for requesting to update the foregoing first information and/or the first conditional information. It should be noted that the hosting update request message may also be referred to as a delegation or hosting request message for application context relocation, a second request message, or another message, provided that a function of the hosting update request message is to request to update the foregoing first information and/or the first conditional information. This is not limited in this embodiment of this application.

Optionally, the hosting update request message carries second conditional information, where the second conditional information is for indicating a second effective condition of the first information. Optionally, the hosting update request message further carries the foregoing transaction identifier, so that the EES may determine, based on the transaction identifier, a hosting transaction to be updated by the EAS. For a difference between the second effective condition and the first effective condition, refer to the foregoing embodiments. Details are not described again in this embodiment of this application.

For example, if the EAS needs to update a hosting duration, that is, update an effective duration of the first information, the hosting update request message may carry the second conditional information, where the second conditional information includes an updated effective duration of the first information. After the EES receives the hosting update request message that carries the second conditional information, if the stored first conditional information includes the effective duration of the first information, the EES replaces the effective duration of the first information with the updated effective duration of the first information. If the originally stored first conditional information does not include the effective duration of the first information, the updated effective duration of the first information is added to the first conditional information.

S505. The EES sends a second response message to the EAS in response to the hosting update request message.

Optionally, the second response message may carry a transaction identifier (transaction id). The transaction identifier is for identifying a hosting transaction in which the EAS delegates or hosts the application context relocation decision-making permission to the EES, or the transaction identifier is for identifying the foregoing first information and first conditional information that are stored on the EES. This helps the EAS update or cancel the hosting transaction subsequently.

Optionally, the second response message may carry the storage address of the application context, to indicate the EAS to synchronize the application context to the EES based on the storage address.

S506. The EAS sends a hosting cancellation request message to the EES. The hosting cancellation request message is for requesting to cancel the delegation or hosting of application context relocation to the EES. It should be noted that the hosting cancellation request message may also be referred to as a delegation or hosting cancellation request message for application context relocation, a third request message, or another message, provided that a function of the hosting cancellation request message is to request cancellation of the hosting of application context relocation to the EES. This is not limited in this embodiment of this application.

Optionally, the hosting cancellation request message further carries the foregoing transaction identifier and/or the first information, so that the EES may determine, based on the transaction identifier and/or the first information, the hosting transaction to be cancelled by the EAS. Optionally, the EAS may send the hosting cancellation request message to the EES when the service enters a peak moment or when it is predicted that the service is about to enter the peak moment.

S507. The EES sends a third response message to the EAS in response to the hosting cancellation request message, where the third response message is for indicating that the EES agrees to the hosting cancellation request message, that is, the EES agrees to cancel the application context relocation decision-making permission of the EES.

In addition, an embodiment of this application further provides a method applied to indicating to relocate an application context between edge enabler function entities.

Figure 6:
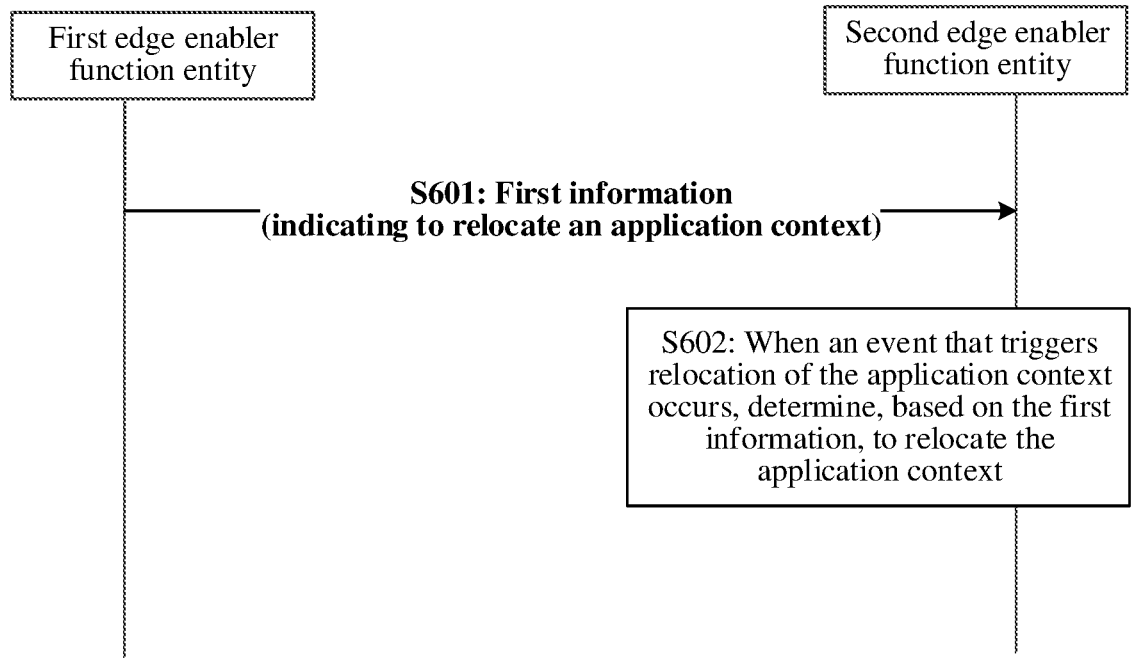
FIG. 6 is a schematic flowchart 2 of an application context relocation method according to an embodiment of this application.

As shown in FIG. 6, an embodiment of this application provides another application context relocation method. The method may be applied to the model of the foregoing MEC architecture. The method includes the following procedure.

S601. A first edge enabler function entity sends first information to a second edge enabler function entity, where the first information is for indicating to relocate an application context associated with an application function entity. The application function entity is an application function entity registered with the first edge enabler function entity.

The first edge enabler function entity may be the edge enabler server in the foregoing MEC architecture, and the second edge enabler function entity may be the edge enabler client in the foregoing MEC architecture. The application function entity may be an edge application server registered with the edge enabler server. The first information may be carried in an EEC registration response (EEC registration response) message sent by the EES to the EEC. Alternatively, the first information may be carried in another message sent by the EES to the EEC. The first information may be referred to as an application relocation delegate indication (relocation delegate indication), and the relocation delegate indication may further include delegating application relocation decision-making permission to the EEC.

S602. When an event that triggers relocation of the application context occurs, the second edge enabler function entity determines, based on the first information, to relocate the application context.

Optionally, when detecting that a terminal device related to the foregoing application function entity moves, the second edge enabler function entity may determine that a service continuity event occurs, that is, detect the event that triggers relocation of the application context.

In this embodiment of this application, the edge enabler server hosts the relocation of the application context to the edge enabler client. When detecting that the application context needs to be relocated, the edge enabler client may determine to relocate the application context. This can reduce an amount of signaling exchange for relocating the application context, shorten a latency, and facilitate normal running of a service.

In an optional implementation, the edge enabler server may be preconfigured with the first information. Optionally, the foregoing application context relocation method may be implemented based on a procedure in which the edge enabler client registers with the edge enabler server.

Figure 7:
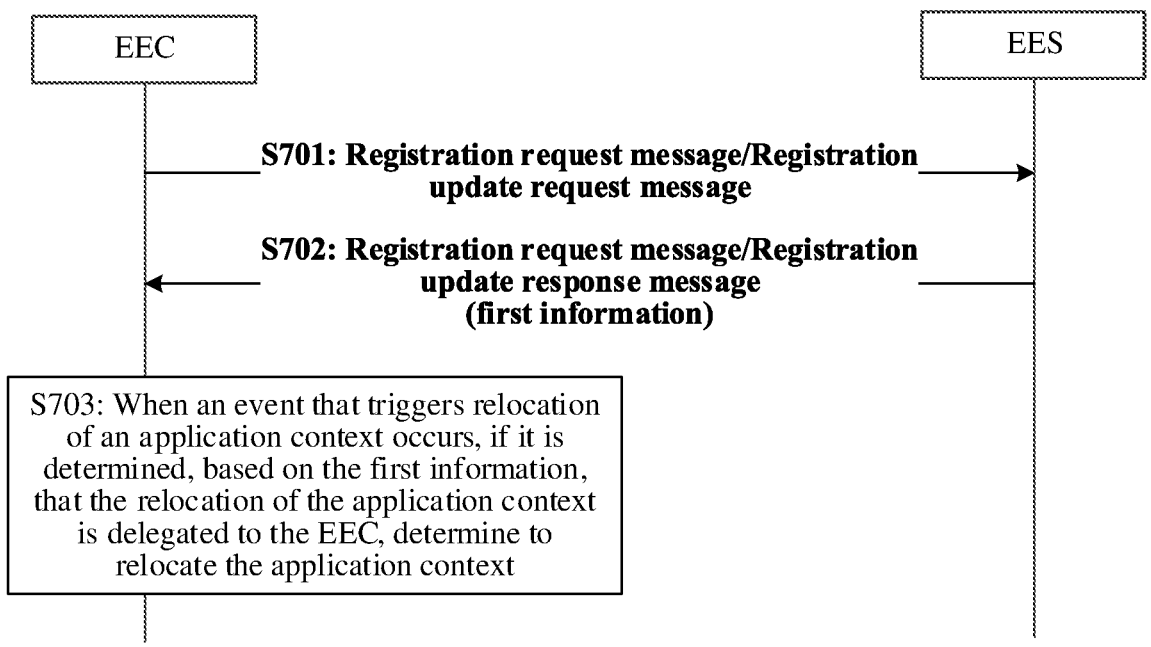
FIG. 7 is a schematic flowchart of registering an EEC with an EES according to an embodiment of this application.

For example, a procedure in which an EEC registers with an EES or registers update with the EES, as shown in FIG. 7, includes the following steps.

S701. The EEC sends a registration request (registration request) message or a registration update request (registration update request) message to the EES, where the registration request message or the registration update request message carries registration information, and the registration information may be an EEC profile. Specifically, the EEC profile includes content described in the following Table 3.

TABLE 3

| Information element | Status | Description |
|---|---|---|
| EEC ID | M | Indicates a unique identifier of an EEC. |
| Registration type indication | M | Indicates an indication of a new registration or an updated registration. |
| UE identifier | O | Indicates an identifier of host UE (namely, a GPSI or an identity token). |
| Security credentials | O | Indicates security credentials generated when an edge computing service is successfully authorized. |
| Application client profile | O | Indicates a profile of an application client for which the EEC provides an edge enabling service. |
| Proposed expiration time | O | Indicates proposed registration expiration time. |
| Context ID | O | Indicates an EEC context identifier obtained from a previous registration. |
| Context ID provider EES ID | O | Indicates an identifier of an EES that provides a context ID if the ID is included. |
| EAS identifiers | O | Indicates identifiers of EASs that have been discovered and that can support a service needed by the EEC. |

S702. The EES sends a registration response (registration response) message or a registration update response (registration update response) message to the EEC.

Optionally, the EAS may include, in the registration response message or the registration update response message, first information that is preconfigured on the EES, to indicate the EEC to relocate the application context. The first information may be from the EAS or be preconfigured on the EES.

S703. When the EEC detects an event that triggers relocation of the application context, if the EEC determines, based on the registration response message or the registration update response message sent by the EES, that the relocation of the application context is delegated to the EEC, the EEC may determine to relocate the application context.

In another optional implementation, the foregoing application context relocation method may be implemented based on a procedure in which the edge enabler client requests the edge enabler server to discover the edge application server.

Figure 8:
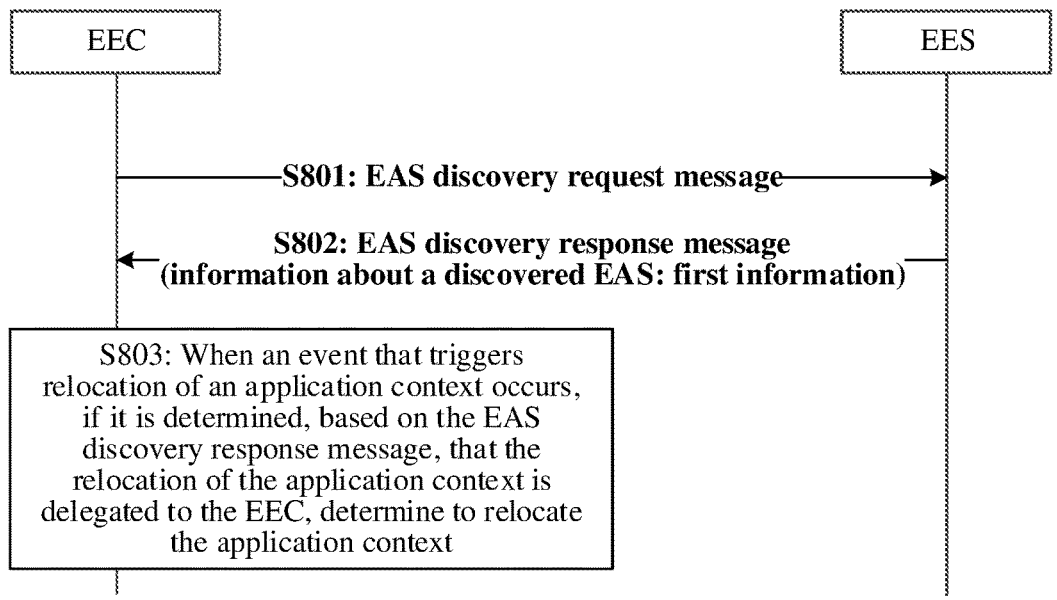
FIG. 8 is a schematic flowchart of discovering an EAS by an EEC by using an EES according to an embodiment of this application.

For example, a procedure in which an EEC discovers an EAS by using an EES shown in FIG. 8 includes the following steps.

S801. The EEC sends an EAS discovery request (EAS discovery request) message to the EES.

Optionally, the EAS discovery request message carries an EEC ID and a security credential. Optionally, the EAS discovery request message carries an EAS discovery filtering parameter, and the EAS discovery filtering parameter is for indicating a target EAS or a class of the target EAS (for example, a game application).

S802. The EES sends an EAS discovery response (EAS discovery response) message to the EEC.

The EAS discovery response message carries information about a discovered EAS. The information about the EAS includes registration information of the EAS, and the registration information of the EAS includes the foregoing first information. Specifically, for example, the EAS discovery response message carries an EAS profile, and the EAS profile includes an application relocation delegate indication (relocation delegate indication). Optionally, if the EAS discovery request message carries the EAS discovery filtering parameter, the EES may determine the discovered EAS based on the EAS discovery filtering parameter, to include the information about the discovered EAS in the EAS discovery response message.

S803. When an event that triggers relocation of the application context occurs, if the EEC determines, based on the EAS discovery response message sent by the EES, that the relocation of the application context is delegated to the EES, the EEC may determine to relocate the application context.

Further, an embodiment of this application further provides a solution for preconfiguring relocation of an application context of some applications for an edge enabler function entity.

In an optional implementation, a list of applications may be configured on an edge enabler server EES. Relocation of an application context of any application in the application list is delegated to the EES, or the EES has permission to relocate an application context of any application in the list of applications. Optionally, the list of applications includes one or more EAS identifiers, and any EAS identifier is for indicating that relocation of an application context of an application corresponding to the EAS identifier is delegated to the EES. The application corresponding to the EAS identifier refers to an application that is deployed and run on an EAS indicated by the EAS identifier. For example, a list of applications that is configured on the EES includes an EAS #ID1 and an EAS #ID2. The EAS #ID1 indicates that relocation of an application context of an application that is deployed and run on an EAS identified as ID1 is delegated to the EES. The EAS #ID2 indicates that relocation of an application context of an application that is deployed and run on an EAS identified as ID2 is delegated to the EES.

Based on this, when the EES detects an event that triggers relocation of an application context, the EES may determine, by querying the preconfigured list of applications, that the application context is an application context of an application in the list of applications, that is, determine that application context relocation decision-making permission is delegated to the EES. Further, the EES may determine to relocate the application context.

Optionally, for any application in the foregoing list of applications, hosting indication information may be configured for an edge application server EAS that is deployed and run, in an EDN, for the any application. The hosting indication information is for indicating that application context relocation decision-making permission of the any application is delegated to the EES. Optionally, the hosting indication information may be the foregoing first information. Specifically, the hosting indication information is configured in an EAS profile.

Figure 9:
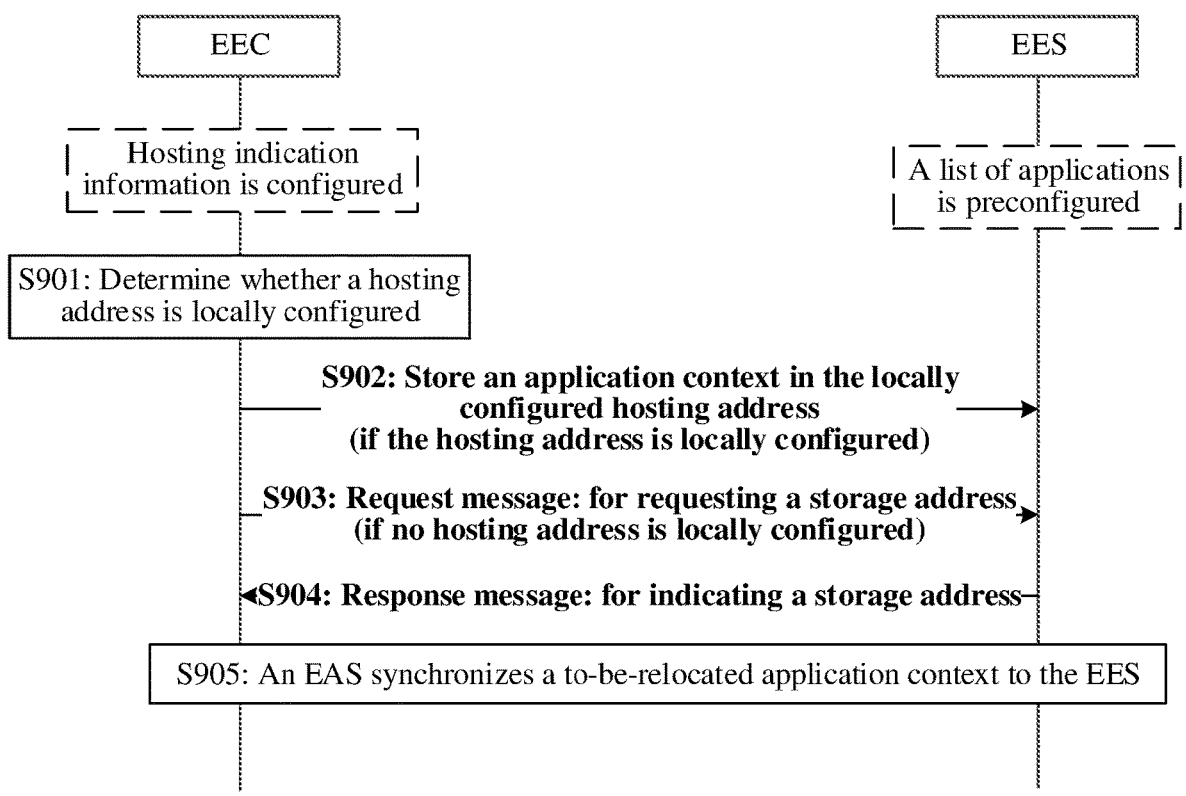
FIG. 9 is a schematic flowchart of an application context synchronization method according to an embodiment of this application.

Optionally, for the edge application server EAS, if the hosting indication information is configured on the EAS, the EAS may synchronize the application context to the ESS. Further, FIG. 9 shows a schematic flowchart of an application context synchronization method according to an embodiment of this application.

S901. An EAS determines whether the EAS is configured with a local hosting address. Hosting indication information is configured on the EAS.

S902. When there is an available local hosting address (or referred to as a storage address) on the EAS, store a to-be-relocated application context in the hosting address. The hosting address may be obtained by the EAS from an EES during registration.

S903. When there is no available local hosting address on the EAS, the EAS sends, to the EES, a request message for requesting a storage address. The request message may carry an identifier of an application user of the to-be-relocated application context, and the identifier may be an IP address of a terminal device corresponding to a client used by the application user or an identifier of the terminal device.

S904. The EES sends a response message of the request message to the EAS in response to the request message from the EAS. The response message carries the storage address allocated by the EES to the EAS. Optionally, the response message further carries an identifier of the to-be-relocated application context, and the identifier is specified by the EES. The identifier may be the identifier of the application user, the IP address of the terminal device corresponding to the client used by the application user, the identifier of the terminal device, or an application context identifier of another type.

S905. The EAS synchronizes the to-be-relocated application context to the EES based on the available local hosting address or the storage address indicated by the EES. Optionally, the application context includes an identifier for identifying the application context. The identifier may be an identifier of an application context received from the EES, or an identifier of an application context specified by the EAS.

In another optional implementation, a list of applications may be configured on an edge enabler client EEC. Relocation of an application context of any application in the list of applications is delegated to the EEC. In other words, the EEC can relocate an application context of any application in the list of applications. Optionally, the list of applications includes one or more EAS identifiers, and any EAS identifier is for indicating that relocation of an application context of an application corresponding to the EAS identifier is delegated to the EES. The application corresponding to the EAS identifier refers to an application that is deployed and run on an EAS indicated by the EAS identifier. For example, a list of applications that is configured on the EEC includes an EAS #ID1 and an EAS #ID2. The EAS #ID1 indicates that relocation of an application context of an application that is deployed and run on an EAS identified as ID1 is delegated to the EEC. The EAS #ID2 indicates that relocation of an application context of an application that is deployed and run on an EAS identified as ID2 is delegated to the EEC.

Based on this, when the EEC detects an event that triggers relocation of an application context, the EEC may determine, by querying the preconfigured list of applications, that the application context is an application context of an application in the list of applications, that is, determine that application context relocation decision-making permission is delegated to the EEC. Further, the EEC may determine to relocate the application context.

Figure 10:
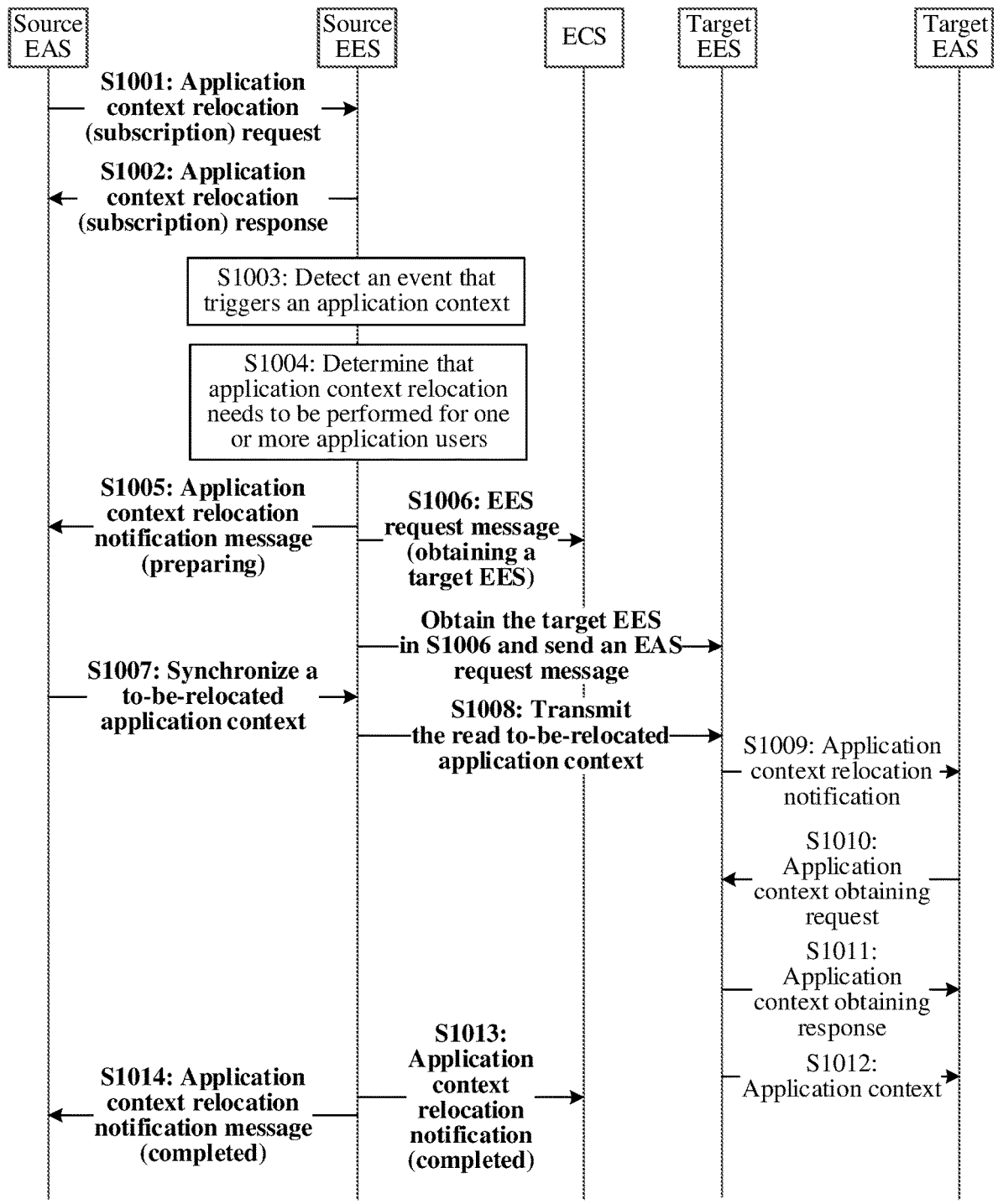
FIG. 10 is a schematic flowchart of a method in which an EAS indicates an EES to relocate an application context according to an embodiment of this application.

For example, FIG. 10 shows a procedure of a method in which an EAS indicates an EES to relocate an application context. The procedure includes the following steps.

S1001. The EAS sends an application context relocation (subscription) request to a source EES. Optionally, the application context relocation (subscription) request includes an application context relocation service mode, and the service mode may be a full service (full service) mode. The application context relocation (subscription) request is for requesting the EES to perform all operations related to an application context. These operations include: detecting an event that triggers relocation of the application context; determining that the application context needs to be relocated; relocating the application context; and performing some cleanup operations after relocation. Further, these operations further include notifying the EEC of information about a target EAS (where the information specifically includes an access address such as an IP address of the target EAS) and notifying a mobile communication network of application relocation information. Optionally, the request message includes an identifier of one or more application users. The identifier may be an identifier or IP address of a terminal that a client used by the application user is on. If the request does not include the identifier of the application user, it may be understood that the EAS requests the EES to perform the foregoing operations related to application context relocation for all application users served by the EAS. The application context relocation (subscription) request or the application context relocation service mode may be considered as the foregoing first information.

S1002. The source EES sends an application context relocation (subscription) response to the EAS. The response message may include an address for application context synchronization. The address may be an IP address, a port number, or a URL. The address is used by the EAS to store a to-be-relocated application context in the address and update the to-be-relocated application context. The application context may be a to-be-relocated context of one or more users served by the EAS. The EES may access and read the to-be-relocated application context in the address. For detailed descriptions of the address, refer to the corresponding descriptions in the foregoing embodiments.

S1003. The source EES detects an event that triggers the application context. Optionally, after receiving the request message obtained in S1001, the source EES may subscribe to a core network element for a user-plane path management event notification, and receive a user-plane path management event notification message from the core network element. The message carries a target DNAI, and the target DNAI indicates that the EAS may be potentially deployed at a location corresponding to the target DNAI. Optionally, the source EES may further subscribe, from a terminal device corresponding to the one or more application users, to a location of the UE and a change of the location, to obtain a latest location of the one or more terminal devices. Optionally, the source EES may further subscribe, from a core network element, to a location of the terminal device corresponding to the one or more application users and a change of the location, to obtain the latest location of the one or more terminal devices. The source EES may determine, based on the user-plane path management event notification and the target DNAI thereof, or the location of the UE, that application context relocation needs to be performed for the one or more application users.

S1004. The source EES determines that application context relocation needs to be performed for the one or more application users. For example, if the UE moves out of a service area (or referred to as an optimal service area) corresponding to the current source EES, the source EES may determine that application context relocation needs to be performed.

S1005. Optionally, when determining that application context relocation needs to be performed for the one or more application users, the source EES sends an application context relocation notification message to the source EAS, to notify the source EAS that the application context relocation needs to be performed for the one or more application users. Notifying the EAS to prepare the to-be-relocated application context is further included.

S1006. The source EES sends an EES request message to an edge configuration server ECS, to obtain a target EES that matches a location corresponding to the one or more users or matches the target DNAI and that may provide information about the target EAS served by the application. After obtaining the target EES from the ECS, the source EES sends an EAS request message to the target EES, where the EAS request message is for requesting to transfer the application context of the one or more users. After the target EES determines the target EAS and determines that the target EAS can receive the application context, the target EES sends a response message to the source EES, to indicate reception of the application context. Further, the request message sent by the source EES to the target EES may be further for obtaining and providing the information about the target EAS served by the application. Optionally, the source EES obtains the information about the target EAS from the target EES.

S1007. After step S1002 and before step S1008, the source EAS synchronizes the to-be-relocated application context to the source EES. For descriptions of synchronizing the application context by the source EAS to the source EES, refer to the corresponding descriptions in the foregoing embodiments.

S1008. When determining that the target EAS can receive the application context, the source EES reads the to-be-relocated application context from the foregoing address, and transfers the application context to the target EES. The target EES stores the received application context in a storage area identified by a specific storage address.

S1009. The target EES sends an application context relocation notification message to the target EAS, to notify the target EAS that an application context needs to be received. The message may include information about an address of the read application context, and the address corresponds to the storage address in which the target EES stores the application context in S1008. This step is optional.

S1010. The target EAS sends an application context obtaining request to the target EES, where the request message is for requesting to obtain the application context. This step is optional.

S1011. The target EES sends an application context obtaining response to the target EAS, where the application context obtaining response is for indicating that the request message is received.

S1012. After receiving the application context, the target EES sends the application context to the target EAS. It may be understood as that a manner in which the target EAS and the target EES process the application context may be implemented, for example, through mapping of the storage address, or through copying or cutting of the application context in different storage spaces on a same physical storage device. The manner is specifically similar to a manner in which the source EAS and the source EES process the application context. Therefore, for the manner, refer to the corresponding descriptions in the foregoing embodiments.

S1013. Optionally, after the transfer of the application context is completed, the source EES sends an application context relocation notification message to the EEC, where the message is for indicating that the transfer of the application context is completed, and the message may include the information about the target EAS, which may be specifically an IP address and a port number of the EAS. Further, the EEC sends a notification message to an AC, to notify the AC that the transfer of the application context is completed. The notification message further includes the information about the target EAS.

S1014. Optionally, after the transfer of the application context is completed, the source EES sends the application context relocation notification message to the source EAS, where the message is for indicating that the transfer of the application context is completed.

S1015. Optionally, the source EES sends an application relocation message to the core network element. Specifically, the application relocation message includes information about an address of the target EAS, routing information of a target N6, and the like. S1015 is not shown in FIG. 10.

Refer to FIG. 10. Based on a same concept, an embodiment of this application provides an application context relocation apparatus 1100. The apparatus 1100 includes a communication module 1101 and a processing module 1102.

(1) The application context relocation apparatus 1100 may be used in an edge enabler function entity. Specifically, the application context relocation apparatus 1100 may be the edge enabler function entity, may be used in the edge enabler function entity, or may be an apparatus that can support the edge enabler function entity in performing a data transmission method. The following describes in detail functions or execution processes of modules in the application context relocation apparatus 1100 that is used in the edge enabler function entity.

The communication module 1101 is configured to receive first information from an application function entity, where the first information is for indicating to relocate an application context associated with the application function entity.

The processing module 1102 is configured to: when an event that triggers relocation of the application context occurs, determine, based on the first information, to relocate the application context.

In this embodiment of this application, the application function entity hosts the relocation of the application context associated with the application function entity to the edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the processing module 1102 is further configured to perform one or more of the following operations based on the first information: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the communication module 1101 is specifically configured to receive registration information from the application function entity, where the registration information includes the first information.

In an optional implementation, the communication module 1101 is further configured to receive first conditional information from the application function entity, where the first conditional information is for indicating a first effective condition of the first information.

In an optional implementation, the first effective condition includes any one or more of the following: an effective duration of the first information, an effective time period of the first information, an application client to which the first information is applicable, a relocation duration of the application context being less than a preset time threshold, a size of the application context being less than a preset size threshold, or the application function entity being overloaded.

In an optional implementation, the communication module 1101 is further configured to receive second conditional information from the application function entity, where the second conditional information is for indicating a second effective condition of the first information, and the second effective condition is different from the first effective condition.

In an optional implementation, the communication module 1101 is further configured to receive the application context from the application function entity.

In an optional implementation, before receiving the application context from the application function entity, the communication module 1101 is further configured to send a storage address of the application context to the application function entity.

In an optional implementation, the application context includes identification information, and the identification information is for uniquely identifying the application context.

(2) The application context relocation apparatus 1100 may be used in an application function entity. Specifically, the application context relocation apparatus 1100 may be the application function entity, may be used in the application function entity, or may be an apparatus that can support the application function entity in performing a data transmission method. The following describes in detail functions or execution processes of modules in the application context relocation apparatus 1100 that is used in the application function entity.

The processing module 1102 is configured to determine first information.

The communication module 1101 is configured to send the first information to an edge enabler function entity, where the first information is for indicating to relocate an application context associated with the application function entity; and the communication module 1101 is further configured to receive response information sent by the edge enabler function entity in response to the first information.

In this embodiment of this application, relocation of the application context is hosted to the edge enabler function entity. When detecting that the application context needs to be relocated, the edge enabler function entity may determine to relocate the application context, so that an amount of signaling exchange for relocating the application context can be reduced, and a latency for relocating the application context can be shortened. This facilitates normal running of a service and reduces time for which service running of an application client on a terminal is affected or interrupted.

In an optional implementation, the first information is further for indicating the edge enabler function entity to perform one or more of the following operations: detecting an event that triggers relocation of the application context; discovering a target application function entity, where the target application function entity is configured to receive the application context; transmitting the application context to an edge enabler function entity associated with the target application function entity; sending information about the target application function entity to a terminal device related to the application function entity; and sending relocation information of the application context to a core network element, where an application corresponding to the application function entity is the same as an application corresponding to the target application function entity.

In an optional implementation, the communication module 1101 is further configured to send registration information to the edge enabler function entity, where the registration information includes the first information.

In an optional implementation, the processing module 1102 is further configured to determine first conditional information; and the communication module 1101 is further configured to send the first conditional information to the edge enabler function entity, where the first conditional information is for indicating a first effective condition of the first information.

In an optional implementation, the first conditional information includes any one or more of the following: an effective duration of the first information, an effective time period of the first information, an application client on which the first information is effective, a relocation duration of the application context being less than a preset time threshold, a size of the application context being less than a preset size threshold, and the application function entity being overloaded.

In an optional implementation, the processing module 1102 is further configured to determine second conditional information; and the communication module 1101 is further configured to send the second conditional information to the edge enabler function entity, where the second conditional information is for indicating a second effective condition of the first information, and the second effective condition is different from the first effective condition.

In an optional implementation, after sending the first information to the edge enabler function entity, the communication module 1101 is further configured to send the application context to the edge enabler function entity.

In an optional implementation, before sending the application context to the edge enabler function entity, the communication module 1101 is further configured to: receive a storage address of the application context from the edge enabler function entity; and send the application context to the edge enabler entity based on the storage address.

In an optional implementation, the application context includes identification information, and the identification information is for uniquely identifying the application context.

Figure 12:
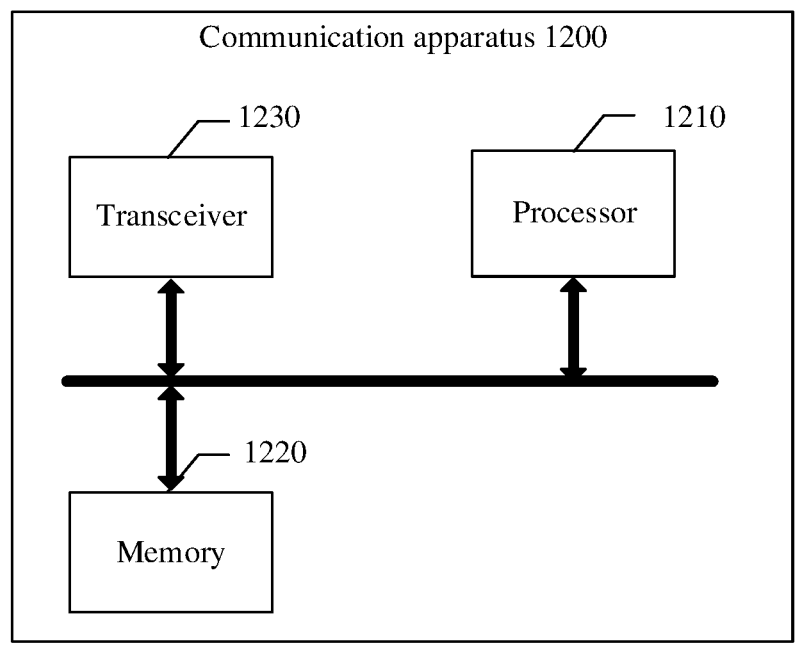
FIG. 12 is a schematic diagram 1 of a structure of a communication apparatus according to an embodiment of this application.

Based on a same concept, as shown in FIG. 12, an embodiment of this application provides a communication apparatus 1200. For example, the communication apparatus 1200 may be a chip or a chip system. Optionally, in this embodiment of this application, the chip system may include a chip, or may include the chip and another discrete device.

The communication apparatus 1200 may include at least one processor 1210. The communication apparatus 1200 may further include at least one memory 1220, configured to store a computer program, program instructions, and/or data. The memory 1220 is coupled to the processor 1210.

The coupling in this embodiment of this application may be an indirect coupling or a communication connection between apparatuses, units, or modules in an electrical form, a mechanical form, or another form, and is used for information exchange between the apparatuses, the units, or the modules. The processor 1210 may operate in collaboration with the memory 1220. The memory 1220 stores a computer program, program instructions, and/or data necessary for implementing any one of the foregoing embodiments. The processor 1210 may execute the computer program stored in the memory 1220, to complete the method in any one of the foregoing embodiments. Optionally, at least one of the at least one memory 1220 may be included in the processor 1210.

The communication apparatus 1200 may further include a transceiver 1230, and the communication apparatus 1200 may exchange information with another device by using the transceiver 1230. The transceiver 1230 may be a circuit, a bus, a transceiver, or any other apparatus that may be configured to exchange information.

In a possible implementation, the communication apparatus 1200 may be used in an edge enabler function entity. Specifically, the communication apparatus 1200 may be the edge enabler function entity, or may be an apparatus that can support the edge enabler function entity and implement a function of the edge enabler function entity in any one of the foregoing embodiments. The memory 1220 stores a computer program, program instructions, and/or data necessary for implementing the function of the edge enabler function entity in any one of the foregoing embodiments. The processor 1210 may execute the computer program stored in the memory 1220, to complete the method performed by the edge enabler function entity in any one of the foregoing embodiments.

In another possible implementation, the communication apparatus 1200 may be used in an application function entity. Specifically, the communication apparatus 1200 may be the application function entity, or may be an apparatus that can support the application function entity and implement a function of the application function entity in any one of the foregoing embodiments. The memory 1220 stores a computer program, program instructions, and/or data necessary for implementing the function of the application function entity in any one of the foregoing embodiments. The processor 1210 may execute the computer program stored in the memory 1220, to complete the method performed by the application function entity in any one of the foregoing embodiments.

A specific connection medium between the transceiver 1230, the processor 1210, and the memory 1220 is not limited in this embodiment of this application. In this embodiment of this application, in FIG. 12, the memory 1220, the processor 1210, and the transceiver 1230 are connected through a bus, and the bus is represented by using a bold line in FIG. 12. A manner of connection between other components is merely described as an example, and imposes no limitation. The bus may be classified as an address bus, a data bus, a control bus, or the like. For ease of representation, the bus is represented by using only one bold line in FIG. 12, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware in the processor and a software module.

In this embodiment of this application, the memory may be a nonvolatile memory such as a hard disk drive (hard disk drive, HDD) or a solid-state drive (solid-state drive, SSD), or may be a volatile memory (volatile memory) such as a random-access memory (random-access memory, RAM). The memory may alternatively be any other medium that can be configured to carry or store expected program code in a form of an instruction structure or a data structure and that can be accessed by a computer. However, this is not limited thereto. The memory in this embodiment of this application may alternatively be a circuit or any other apparatus that can implement a storage function, and is configured to store the computer program, the program instructions, and/or the data.

Figure 13:
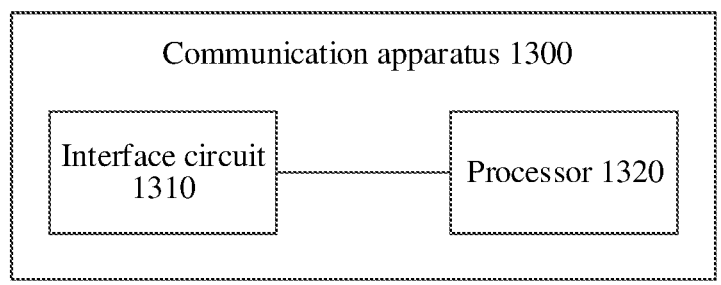
FIG. 13 is a schematic diagram 2 of a structure of a communication apparatus according to an embodiment of this application.

Refer to FIG. 13. Based on the foregoing embodiments, an embodiment of this application further provides another communication apparatus 1300, including an interface circuit 1310 and a processor 1320. The interface circuit 1310 is configured to receive code instructions and transmit the code instructions to the processor. The processor 1320 is configured to run the code instructions to perform the method performed by the edge enabler function entity or the method performed by the application function entity in any one of the foregoing embodiments.

Based on the foregoing embodiments, an embodiment of this application further provides a computer-readable storage medium. The computer-readable storage medium stores instructions. When the instructions are executed, the method performed by the edge enabler function entity or the method performed by the application function entity in any one of the foregoing embodiments is enabled to be implemented. The computer-readable storage medium may include any medium that can store program code, such as a USB flash drive, a removable hard disk, a read-only memory, a random-access memory, a magnetic disk, or an optical disc.

Figure 11:
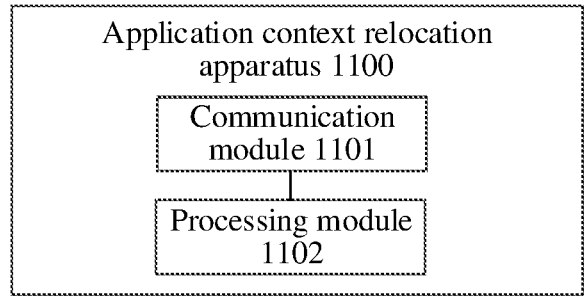
FIG. 11 is a block diagram of a structure of an application context relocation apparatus according to an embodiment of this application.

To implement functions of the communication apparatuses in FIG. 11 to FIG. 13, an embodiment of this application further provides a chip, including a processor, configured to support the communication apparatuses in implementing functions related to the edge enabler function entities or the application function entities in the foregoing method embodiments. In a possible design, the chip is connected to a memory or the chip includes the memory, and the memory is configured to store program instructions and data that are necessary for the communication apparatuses.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer-readable memory that can guide the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to embodiments of this application without departing from the scope of embodiments of this application. In this case, this application is intended to cover these modifications and variations provided that these modifications and variations to embodiments of this application fall within the claims of this application and their equivalent technologies.

What is claimed is:

1. An application context relocation method, wherein the method comprises:
receiving, by an edge enabler server, first information from an application function entity, wherein the first information indicates the edge enabler server to perform operations including:
detecting an event that triggers a relocation of an application context associated with the application function entity;
when the event occurs, determining to relocate the application context;
discovering a target application function entity, wherein the target application function entity is configured to receive the application context;
transmitting the application context to a target edge enabler server associated with the target application function entity;
sending information about the target application function entity to a terminal device related to the application function entity; and
sending relocation information of the application context to a core network element, wherein an application corresponding to the application function entity is the same as an application corresponding to the target application function entity; and
performing, by the edge enabler server, the operations based on the first information.

2. The method according to claim 1, wherein the method further comprises:
receiving the application context from the application function entity.

3. The method according to claim 2, wherein before the receiving the application context from the application function entity, the method further comprises:
sending a storage address of the application context to the application function entity.

4. An application context relocation method, comprising:
sending, by an application function entity, first information to an edge enabler server, wherein the first information indicates to the edge enabler server to perform operations including:
detecting an event that triggers relocation of an application context associated with the application function entity;
when the event occurs, determining to relocate the application context;
discovering a target application function entity, wherein the target application function entity is configured to receive the application context;
transmitting the application context to a target edge enabler server associated with the target application function entity;
sending information about the target application function entity to a terminal device related to the application function entity;
sending relocation information of the application context to a core network element. wherein an application corresponding to the application function entity is the same as an application corresponding to the target application function entity; and
receiving response information from the edge enabler-function entity server in response to the first information.

5. The method according to claim 4, wherein after the sending first information to an edge enabler server, the method further comprises:
sending the application context to the edge enabler server.

6. The method according to claim 5, wherein the response information comprises: receiving a storage address of the application context; and
wherein the sending the application context to the edge enabler server comprises: sending the application context to the edge enabler server based on the storage address.

7. An edge enabler server, comprising at least one processor, wherein the at least one processor is coupled to at least one memory storing programming instructions, wherein the programming instructions, when executed by the at least one processor, cause the apparatus to perform steps comprising:
receiving first information from an application function entity, wherein the first information indicates the edge enabler server to perform operations including
detecting an event that triggers a relocation of an application context associated with the application function entity;
when the event occurs, determining to relocate the application context;
discovering a target application function entity, wherein the target application function entity is configured to receive the application context;
transmitting the application context to a target edge enabler server associated with the target application function entity;
sending information about the target application function entity to a terminal device related to the application function entity; and
sending relocation information of the application context to a core network element. wherein an application corresponding to the application function entity is the same as an application corresponding to the target application function entity; and
performing the operations based on the first information.

8. The communication apparatus according to claim 7, wherein the steps comprise:
receiving the application context from the application function entity.

9. The communication apparatus according to claim 8, wherein the steps comprise:
before the receiving the application context from the application function entity, sending a storage address of the application context to the application function entity.

10. A communication apparatus, comprising at least one processor, wherein the at least one processor is coupled to at least one memory storing programming instructions, wherein the programming instructions, when executed by the at least one processor, cause the apparatus to perform steps comprising:
sending first information to an edge enabler server, wherein the first information indicates to the edge enabler server to perform operations including:
detecting an event that triggers relocation of an application context associated with an application function entity;
when the event occurs, determining to relocate the application context;
discovering a target application function entity, wherein the target application function entity is configured to receive the application context;
transmitting the application context to a target edge enabler server associated with the target application function entity;
sending information about the target application function entity to a terminal device related to the application function entity;
sending relocation information of the application context to a core network element, wherein an application corresponding to the application function entity is the same as an application corresponding to the target application function entity; and
receiving response information from the edge enabler function entity server in response to the first information.

11. The communication apparatus according to claim 10, wherein the steps comprise:
after the sending first information to an edge enabler server, sending the application context to the edge enabler server.

12. The communication apparatus according to claim 11, wherein the response information comprises: a storage address of the application context; and
wherein the sending the application context to the edge enabler server comprises: sending the application context to the edge enabler server based on the storage address.

13. The communication apparatus according to claim 10, wherein the communication apparatus is an application function entity.

14. The method according to claim 1, wherein the method further comprises: sending, by the application function entity, the first information to the edge enabler server.

15. A communication system, comprising:
an application function entity configured to:
send first information to an edge enabler server, wherein the first information indicates to the edge enabler server to perform operations including:
detecting an event that triggers relocation of an application context associated with the application function entity;
when the event occurs, determining to relocate the application context;
discovering a target application function entity, wherein the target application function entity is configured to receive the application context;
transmitting the application context to a target edge enabler server associated with the target application function entity;
sending information about the target application function entity to a terminal device related to the application function entity;
sending relocation information of the application context to a core network element, wherein an application corresponding to the application function entity is the same as an application corresponding to the target application function entity; and
the edge enabler server configured to:
receive the first information; and
perform the operations based on the first information.

* * * * *